United States Patent
Lee et al.

(10) Patent No.: US 11,222,412 B2
(45) Date of Patent: Jan. 11, 2022

(54) IMAGE PROCESSING DEVICE AND METHOD

(71) Applicant: Silicon Works Co., Ltd., Daejeon (KR)

(72) Inventors: Do Hoon Lee, Daejeon (KR); Jin Woo Park, Daejeon (KR); Jin Ho Lee, Daejeon (KR); Kyung Jin Park, Daejeon (KR); Heung Lyeol Lee, Daejeon (KR); Hyun Kyu Jeon, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 112 days.

(21) Appl. No.: 16/715,164

(22) Filed: Dec. 16, 2019

(65) Prior Publication Data

US 2020/0211167 A1 Jul. 2, 2020

(30) Foreign Application Priority Data

Dec. 26, 2018 (KR) .......................... 10-2018-0169628

(51) Int. Cl.
*G06T 5/00* (2006.01)
*G06T 3/40* (2006.01)

(52) U.S. Cl.
CPC ............ *G06T 5/009* (2013.01); *G06T 3/4007* (2013.01); *G06T 5/002* (2013.01); *G06T 2207/10024* (2013.01); *G06T 2207/20224* (2013.01)

(58) Field of Classification Search
CPC ....... G06T 3/4007; G06T 3/4053; G06T 3/40; G06T 7/215; G06T 7/254; G06T 7/90; G06T 7/11; G06T 7/12; G06T 7/32; G06T 2207/20224; G06T 2207/10024; G06T 2207/10004; G06T 2207/20012; G06T 2207/20016; G06T 2207/20182; G06T 2207/11016; G06T 2207/20024; G06T 2207/20192; G06T 2207/20221; G06T 2207/20021; G06K 9/00765; G06K 9/40; G06K 9/44; G06K 9/4647; G06K 9/6212; G06K 9/4652; G06K 9/38; G06K 9/46;
(Continued)

(56) References Cited

U.S. PATENT DOCUMENTS 4,231,065 A 10/1980 Fitch et al.
5,081,492 A 1/1992 Hammond
(Continued)

FOREIGN PATENT DOCUMENTS

| EP | 1150248 A2 | 10/2011 |
|---|---|---|
| KR | 2012-0027712 A | 3/2012 |
| KR | 2013-0037353 A | 4/2013 |
| KR | 2014-0072386 A | 6/2014 |

*Primary Examiner* — Jose L Couso
(74) *Attorney, Agent, or Firm* — Polsinelli PC

(57) ABSTRACT

The disclosure provides an image processing device and method capable of removing a halo artifact and increasing contrast enhancement effect when enhancing the contrast of an image. The image processing method includes obtaining a first blurring image by performing interpolation based on a representative value of each of blocks, having a predetermined size, of a previous frame image; obtaining a second blurring image in which boundary information is restored, through a weighted sum of a current frame image and the first blurring image; and performing contrast enhancement on the current frame image by using a difference image between the second blurring image and the current frame image.

20 Claims, 4 Drawing Sheets

(58) Field of Classification Search
CPC .............. G06K 15/1878; G06K 7/1469; G06K 2009/4666; H04N 1/58; H04N 1/409; H04N 1/4092; H04N 1/60; H04N 1/46; H04N 1/6033; H04N 1/56; H04N 1/6008; H04N 1/6027; H04N 1/6075; H04N 1/6077; H04N 1/40075; H04N 5/208; H04N 5/145; H04N 5/21; H04N 5/357; H04N 5/142; H04N 5/23232; H04N 5/2355; H04N 5/57; H04N 5/20; H04N 9/646; H04N 9/04515; H04N 9/3182; H04N 9/64; H04N 9/76; H04N 9/77; H04N 9/643; H04N 7/014; H04N 7/0132; H04N 7/0135; H04N 7/0147; H04N 7/0142; H04N 7/0145; H04N 19/132; H04N 19/577; H04N 19/587; H04N 19/86; H04N 19/59; H04N 19/80; H04N 21/4318; H04N 21/44008; H04N 2009/046; G09G 2320/0261; G09G 2320/106; G09G 2320/066; G01J 3/46; G01J 3/462; G01J 3/524

See application file for complete search history.

(56) References Cited

U.S. PATENT DOCUMENTS

| | | | |
|---|---|---|---|
| 6,915,024 B1* | 7/2005 | Maurer | G06T 5/008 |
| | | | 382/251 |
| 7,773,257 B2 | 8/2010 | Ciurea et al. | |
| 7,889,949 B2 | 2/2011 | Cohen et al. | |
| 8,502,894 B2 | 8/2013 | Chiang | |
| 2007/0009168 A1 | 1/2007 | Kim | |
| 2007/0036456 A1* | 2/2007 | Hooper | G06T 5/008 |
| | | | 382/274 |
| 2008/0266413 A1* | 10/2008 | Cohen | G06T 5/20 |
| | | | 348/222.1 |
| 2010/0002952 A1 | 1/2010 | Oizumi et al. | |
| 2011/0096366 A1 | 4/2011 | Oka | |
| 2012/0051730 A1* | 3/2012 | Cote | G03B 3/10 |
| | | | 396/90 |
| 2013/0114912 A1 | 5/2013 | Schirris et al. | |
| 2013/0301949 A1* | 11/2013 | Springer | G06T 5/00 |
| | | | 382/255 |
| 2015/0036943 A1* | 2/2015 | Lin | G06T 3/4053 |
| | | | 382/264 |
| 2016/0371816 A1* | 12/2016 | Choudhury | G06T 7/254 |
| 2017/0064204 A1* | 3/2017 | Sapiro | G06T 5/50 |
| 2020/0051206 A1* | 2/2020 | Munkberg | G06T 5/002 |

* cited by examiner

IMAGE PROCESSING DEVICE AND METHOD

CROSS-REFERENCE TO RELATED APPLICATIONS

The present application claims priority to Korean Application No. 10-2018-0169628, filed Dec. 26, 2018 the contents of which are hereby incorporated by reference as set for fully herein.

BACKGROUND

1. Technical Field

Various embodiments generally relate to a display device, and more particularly, to an image processing device and method for improving the contrast of an image.

2. Related Art

In general, a dynamic range of an imaging device is limited compared to a dynamic range of a contrast perceived by the human eye. A display device enhances the contrast of an input image in order to express a captured image similar to a scene viewed by the human eye.

As one of ways to enhance the contrast of an image, unsharp masking is disclosed in the art. The unsharp masking is used a lot for local contrast enhancement, as a way of enhancing the contrast of an image based on a blurring image.

However, the unsharp masking may encounter a problem in that a halo artifact strongly occurs near a boundary, in the case where a blurring image is extensively taken, or may encounter a problem in that it is difficult to anticipate high local contrast enhancement effect, in the case where a blurring image is taken within a small range.

SUMMARY

Various embodiments are directed to an image processing device and method capable of removing a halo artifact and increasing contrast enhancement effect when enhancing the contrast of an image.

In an embodiment, an image processing method may include: obtaining a first blurring image by performing interpolation based on a representative value of each of blocks, having a predetermined size, of a previous frame image; obtaining a second blurring image in which boundary information is restored, through a weighted sum of a current frame image and the first blurring image; and performing contrast enhancement on the current frame image by using a difference image between the second blurring image and the current frame image.

In an embodiment, an image processing device suitable for performing contrast enhancement on an input image may include: a processor configured to obtain a first blurring image by performing interpolation based on a representative value of each of blocks, having a predetermined size, of a previous frame image, obtain a second blurring image in which boundary information is restored, through a weighted sum of a current frame image and the first blurring image, and perform contrast enhancement on the current frame image by using a difference image between the second blurring image and the current frame image.

According to the embodiments of the disclosure, since a first blurring image is obtained by performing interpolation based on a representative value of each of blocks, having a predetermined size, of a previous frame image, contrast enhancement effect may be increased.

Further, according to the embodiments of the disclosure, since a first weight of the first blurring image and a second weight of a current frame image are calculated using the current frame image and the first blurring image and a second blurring image having restored boundary information is obtained by a weighted average of the current frame image and the first blurring image depending on the first and second weights, a halo artifact that occurs in contrast enhancement may be effectively removed.

DETAILED DESCRIPTION

Figure 1:
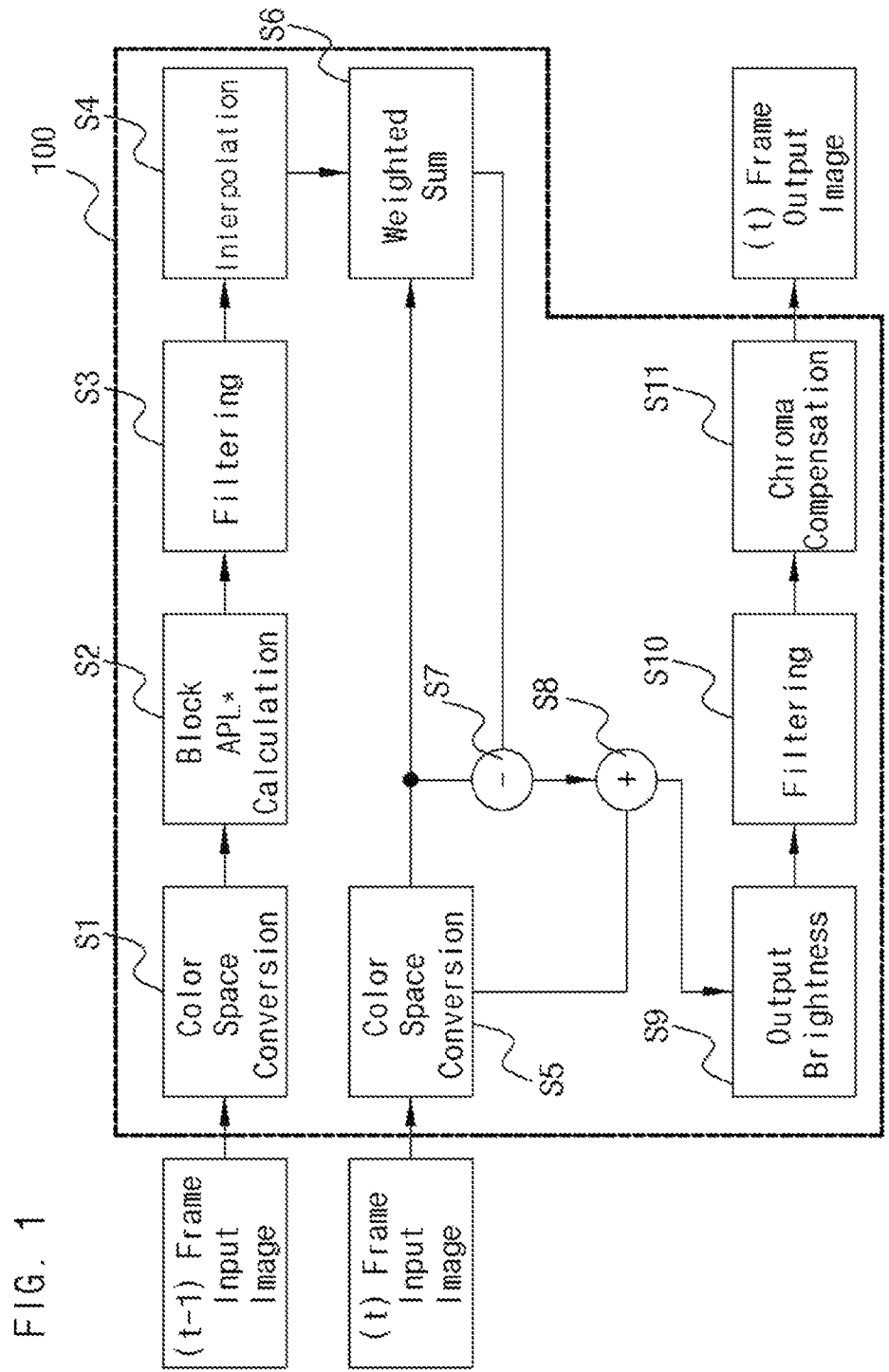
FIG. 1 is a representation of an example of a block diagram to assist in the explanation of an image processing device and method in accordance with an embodiment of the disclosure.

Hereinafter, embodiments of the disclosure will be described in detail with reference to the accompanying drawings. The terms used herein and in the claims shall not be construed by being limited to general or dictionary meanings and shall be interpreted based on the meanings and concepts corresponding to technical aspects of the disclosure.

Embodiments described herein and configurations illustrated in the drawings are preferred embodiments of the disclosure, and, because they do not represent all of the technical features of the disclosure, there may be various equivalents and modifications that can be made thereto at the time of the present application.

Embodiments of the disclosure provide an image processing device and method capable of removing a halo artifact and increasing contrast enhancement effect when performing contrast enhancement on an input image.

The embodiments of the disclosure may use first and second blurring images to enhance the contrast of an input image. The first blurring image may be defined as an image obtained by interpolation using representative values of blocks of a previous frame image, and the second blurring image may be defined as an image having restored boundary information depending on a current frame image and a weighted sum.

FIG. 1 is a representation of an example of a block diagram to assist in the explanation of an image processing device and method in accordance with an embodiment of the disclosure.

Referring to FIG. 1, the image processing device performs contrast enhancement on a received input image, and outputs a result image obtained by compensating for color difference information, as an output image.

First, a process in which contrast enhancement is performed on the received input image may be described as follows.

A processor 100 obtains a first blurring image by performing interpolation based on a representative value of each of blocks, having a predetermined size, of a previous frame image of the input image.

Describing in detail a process in which the first blurring image is obtained, the processor 100 converts R, G and B data of the previous (t−1) frame image of the input image into brightness values according to the purpose of enhancing local contrast in brightness information of an image by local contrast enhancement (S1), divides the previous (t−1) frame image into blocks having a predetermined size and calculates a representative value of each of the blocks (S2), filters the representative value of each of the blocks (S3), and obtains the first blurring image by performing interpolation to the size of an original image based on the representative value of each of the blocks (S4).

The filtering step S3 of FIG. 1 may remove artifacts that may occur when directly performing interpolation on the previously obtained representative values of the blocks. A representative artifact that occurs most frequently in block-based computation is a blocking artifact.

The embodiment of FIG. 1 illustrates that, when calculating a representative value of each of blocks, the previous (t−1) frame image is divided into the blocks having a predetermined size and then the representative value of each of the blocks is calculated by averaging values of pixels included in the blocks. When calculating a representative value of each of the blocks, at least one of an average value, a median value and a pooling value with respect to values of the pixels of the blocks may be calculated as the representative value for each block.

In the interpolation step S4 of FIG. 1, interpolation is performed to the size of the original image based on the representative value obtained for each of the blocks, and an image obtained by the interpolation may replace an existing blurring image according to an interpolation weight table. The above scheme as an unsharp masking-based algorithm requires an extensive blurring image to increase contrast enhancement effect. In this regard, when the extensive blurring image is simply obtained based on a current frame image, a large number of frame buffers are needed in terms of hardware cost. However, in the case where the above scheme is used as in the present embodiment, only buffers which occupy a space for storing only the representative values of the blocks of the previous frame image are needed, and thus, an advantage may be provided in terms of hardware cost.

The processor 100 may obtain a second blurring image in which boundary information is restored, through a weighted sum of a current (t) frame image and the first blurring image.

Describing in detail a process in which the second blurring image having restored boundary information is obtained, the processor 100 converts R, G and B data of the current (t) frame image into brightness values (S5), calculates a first weight of the first blurring image and a second weight of the current (t) frame image by using the current (t) frame image and the first blurring image, and obtains the second blurring image by a weighted average of applying the first weight to the first blurring image and applying the second weight to the current (t) frame image (S6).

In the weighted sum step S6 of FIG. 1, since the first blurring image obtained by the interpolation does not preserve boundary information, the second blurring image having restored boundary information is obtained by utilizing the information between the current frame image and the first blurring image. In the present embodiment, since the second blurring image having restored boundary information is obtained by using the information between the current frame image and the first blurring image, a large-capacity frame buffer for storing an existing blurring image in which boundary information is preserved and a boundary detection algorithm are not needed.

In the case of the present embodiment, the new second blurring image in which boundary information is restored is obtained by calculating the first and second weights through using only the information on a frame buffer storing the representative value of each of the blocks and the information on the first blurring image obtained by the interpolation and the current frame image. Thus, the present embodiment may provide an advantage in that a large size buffer for storing information on peripheral pixels is not needed.

The processor 100 may calculate the first and second weights in such a way to increase or decrease the first and second weights depending on the difference between a maximum value and a minimum value among representative values around a current position in the current (t) frame image and to increase or decrease the first and second weights depending on the difference between a value of the current frame image and a value of the first blurring image at the current position. The current position may be defined as a position to acquire the second blurring image having the restored boundary information.

For instance, when calculating the first and second weights, as the difference between the maximum value and the minimum value of the representative values around the current position becomes larger, the processor 100 may decrease the first weight and increase the second weight so that a halo artifact does not occur when boundary information is restored.

Also, when calculating the first and second weights, as the difference between the value of the current frame image and the value of the first blurring image at the current position becomes larger, the processor 100 may increase the first weight and decrease the second weight to increase contrast enhancement.

The processor 100 may perform contrast enhancement on the current frame image by using a difference image between the second blurring image and the current (t) frame image. Specifically, the processor 100 obtains a difference image between the second blurring image and the current (t) frame image (S7), and enhances a contrast with respect to the brightness information of the current (t) frame image (S9) through the sum of the current (t) frame image and the difference image (S8).

The processor 100 may compensate for color difference information of the current frame image on which the contrast enhancement is performed (S11). For example, the processor 100 may prevent the degradation of an output image to be outputted as a result image, by compensating for color difference information through applying a change in brightness information even to color difference information.

Figures 2, 3:
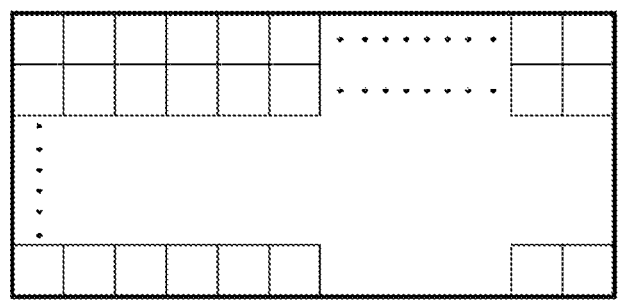
FIG. 2 is a representation of an example of a diagram to assist in the explanation of a process in which a previous frame image is divided into block units having a predetermined size in accordance with the embodiment of the disclosure.
FIG. 3 is an exemplary diagram using an average value of pixels as a representative value of each of the blocks of FIG. 2.

FIG. 2 is a representation of an example of a diagram to assist in the explanation of a process in which a previous frame image is divided into block units having a predetermined size in accordance with the embodiment of the disclosure, and FIG. 3 is an exemplary diagram using an average value of pixels as a representative value of each of the blocks of FIG. 2. In FIG. 3, M and N represent horizontal and vertical lengths of the block unit having the predetermined size.

Referring to FIGS. 2 and 3, it is illustrated that a representative value of each of the blocks in FIG. 1 is calculated as an average value of pixels.

When an input image is inputted by a raster scan method on hardware, a representative value is calculated for each block size that is initially set, and then, the data is written to a buffer to store the representative value. As an example for this, an average value may be used as illustrated in FIG. 3, and a median value or a general pooling value may be used.

Figure 4:
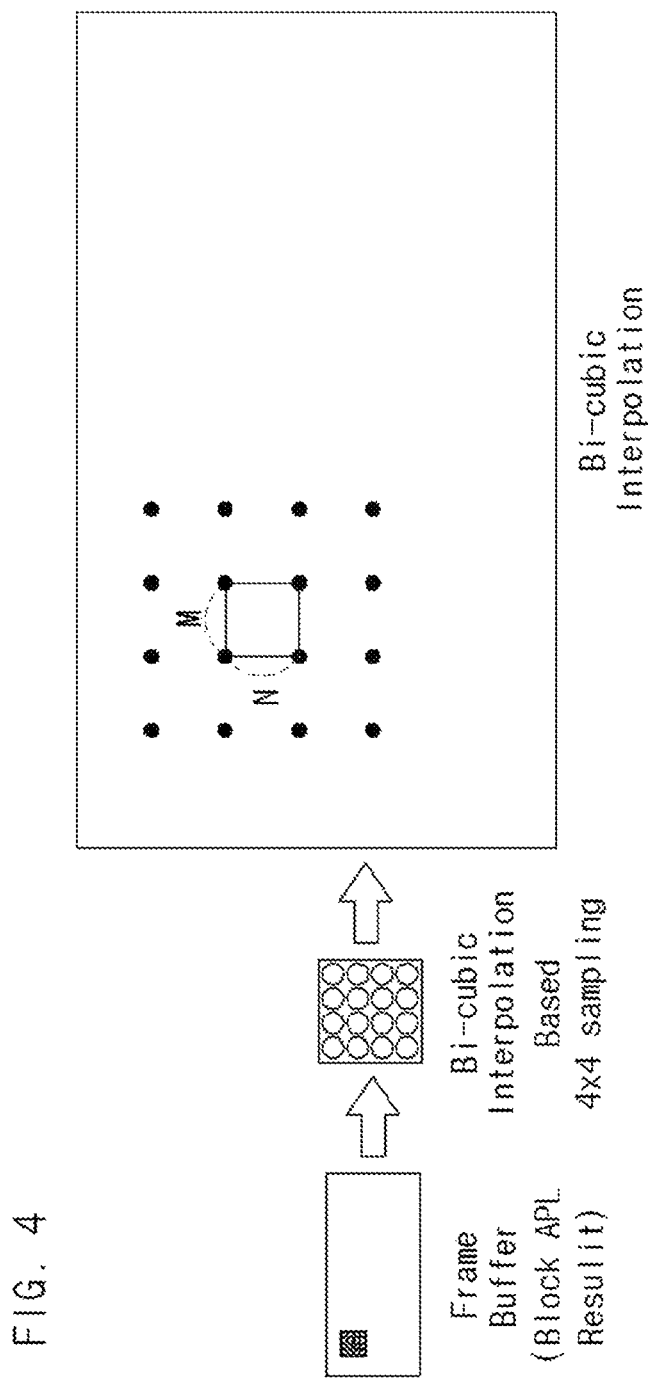
FIG. 4 is a diagram illustrating a representation of an example of a process in which a first blurring image is obtained by performing interpolation based on a representative value of each of the blocks of FIG. 2.

FIG. 4 is a diagram illustrating a representation of an example of a process in which a first blurring image is obtained by performing interpolation based on a representative value of each of the blocks of FIG. 2.

Referring to FIG. 4, as an example of the interpolation step S4 of FIG. 1, bi-cubic interpolation is illustrated.

In the case where interpolation is performed as illustrated in FIG. 4, the size of a frame buffer may vary depending on the size of an image and the size of a block. In the case where the size of a frame buffer is set to be smaller than a buffer for obtaining a minimum first blurring image, economical design is made possible in terms of hardware. As the interpolation used at this time, various schemes such as bi-linear interpolation may be used in addition to the bi-cubic interpolation mentioned above as an example.

Figure 5:
FIG. 5 is a diagram illustrating a representation of an example of a process in which a blurring image having restored boundary information is obtained by calculating the weight of a blurring image and the weight of a current frame image, in accordance with the embodiment of the disclosure.

FIG. 5 is a diagram illustrating a representation of an example of a process in which a blurring image having restored boundary information is obtained by calculating the weight of a blurring image and the weight of a current frame image, in accordance with the embodiment of the disclosure.

Referring to FIGS. 1 and 5, the present embodiment aims to effectively remove a halo artifact that occurs when performing local contrast enhancement based on unsharp masking. Thus, by using a blurring image in which boundary information is restored, as a blurring image to be used in the unsharp masking, a halo artifact may be removed.

In the present embodiment, a new second blurring image may be obtained by calculating first and second weights based on 'a representative value of a blurring image around a current position' stored in a frame buffer, 'an input image value at the current position' and 'a value obtained by performing interpolation.'

As examples for the first and second weights, $w_1$ may be $abs(V_3-V_4)/V_1-V_2$, and $w_2$ may be $1-abs(V_3-V_4)/V_1-V_2$.

Describing in further detail FIG. 5 and the above equations, in the present embodiment, the first and second weights may be calculated in such a way to increase or decrease the first and second weights depending on the difference between a maximum value V1 and a minimum value V2 among representative values around a current position in the current (t) frame image and to increase or decrease the first and second weights depending on the difference between a value V3 of the current frame image at the current position and a value V4 of the first blurring image at the current position.

For instance, in the present embodiment, when calculating the first and second weights, as the difference between the maximum value V1 and the minimum value V2 of the representative values around the current position becomes larger, the first weight may be decreased and the second weight may be increased so that a halo artifact does not occur when boundary information is restored.

Also, when calculating the first and second weights, as the difference between the value V3 of the current frame image at the current position and the value V4 of the first blurring image at the current position becomes larger, the processor 100 may increase the first weight and decrease the second weight to increase contrast enhancement.

As is apparent from the above descriptions, according to the embodiments of the disclosure, since a first blurring image is obtained by performing interpolation based on a representative value of each of blocks, having a predetermined size, of a previous frame image, contrast enhancement effect may be increased.

Further, since a first weight of the first blurring image and a second weight of a current frame image are calculated using the current frame image and the first blurring image and a second blurring image having restored boundary information is obtained by a weighted average of the current frame image and the first blurring image depending on the first and second weights, a halo artifact that occurs in contrast enhancement may be effectively removed.

While various embodiments have been described above, it will be understood to those skilled in the art that the embodiments described are by way of example only. Accordingly, the disclosure described herein should not be limited based on the described embodiments.

What is claimed is:

1. An image processing method comprising:
    obtaining a first blurring image by performing interpolation based on a representative value of each of blocks, having a predetermined size, of a previous frame image;
    obtaining a second blurring image in which boundary information is restored, through a weighted sum of a current frame image and the first blurring image; and
    performing contrast enhancement on the current frame image by using a difference image between the second blurring image and the current frame image.

2. The image processing method according to claim 1, wherein the obtaining of the first blurring image comprises:
    converting R, G and B data of the previous frame image into brightness values;
    dividing the previous frame image into the blocks having the predetermined size, and calculating the representative value of each of the blocks; and
    obtaining the first blurring image by performing interpolation to a size of an original image based on the representative value of each of the blocks.

3. The image processing method according to claim 2, wherein the calculating of the representative value of each of the blocks calculates the representative value by using at least one of an average value, a median value and a pooling value with respect to a value of pixels of each of the blocks.

4. The image processing method according to claim 1, wherein the obtaining of the second blurring image comprises:
    calculating a first weight of the first blurring image and a second weight of the current frame image by using the current frame image and the first blurring image; and
    obtaining the second blurring image from a weighted average of applying the first weight to the first blurring image and applying the second weight to the current frame image.

5. The image processing method according to claim 4, wherein the calculating of the first and second weights increases or decreases the first and second weights depending on a difference between a maximum value and a minimum value among representative values around a current position in the current frame image, and increases or decreases the first and second weights depending on a difference between a value of the current frame image and a value of the first blurring image at the current position.

6. The image processing method according to claim 5, wherein, as the difference between the maximum value and the minimum value of the representative values around the current position becomes larger, the first weight is decreased and the second weight is increased so that a halo artifact does not occur when the boundary information is restored.

7. The image processing method according to claim 6, wherein, as the difference between the value of the current frame image and the value of the first blurring image at the current position becomes larger, the first weight is increased and the second weight is decreased to increase contrast enhancement.

8. The image processing method according to claim 1, wherein the performing of the contrast enhancement on the current frame image comprises:
   obtaining a difference image between the second blurring image and the current frame image; and
   enhancing a contrast of the current frame image through a sum of the current frame image and the difference image.

9. The image processing method according to claim 1, further comprising:
   compensating for color difference information of the current frame image on which the contrast enhancement is performed.

10. The image processing method according to claim 9, wherein the compensating for of the color difference information prevents degradation of a result image to be outputted, by applying a change in brightness information to the color difference information.

11. An image processing device suitable for performing contrast enhancement on an input image, comprising:
    a processor configured to obtain a first blurring image by performing interpolation based on a representative value of each of blocks, having a predetermined size, of a previous frame image, obtain a second blurring image in which boundary information is restored, through a weighted sum of a current frame image and the first blurring image, and perform contrast enhancement on the current frame image by using a difference image between the second blurring image and the current frame image.

12. The image processing device according to claim 11, wherein the processor converts R, G and B data of the previous frame image into brightness values, divides the previous frame image into the blocks having the predetermined size and calculates the representative value of each of the blocks, and obtains the first blurring image by performing interpolation to a size of an original image based on the representative value of each of the blocks.

13. The image processing device according to claim 12, wherein the processor calculates at least one of an average value, a median value and a pooling value with respect to a value of pixels of each of the blocks, as the representative value of each of the blocks.

14. The image processing device according to claim 11, wherein the processor calculates a first weight of the first blurring image and a second weight of the current frame image by using the current frame image and the first blurring image, and obtains the second blurring image from a weighted average of applying the first weight to the first blurring image and applying the second weight to the current frame image.

15. The image processing device according to claim 14, wherein the processor calculates the first and second weights by increasing or decreasing the first and second weights depending on a difference between a maximum value and a minimum value among representative values around a current position in the current frame image and by increasing or decreasing the first and second weights depending on a difference between a value of the current frame image and a value of the first blurring image at the current position.

16. The image processing device according to claim 15, wherein, when calculating the first and second weights, as the difference between the maximum value and the minimum value of the representative values around the current position becomes larger, the processor decreases the first weight and increases the second weight so that a halo artifact does not occur when the boundary information is restored.

17. The image processing device according to claim 16, wherein, when calculating the first and second weights, as the difference between the value of the current frame image and the value of the first blurring image at the current position becomes larger, the processor increases the first weight and decreases the second weight to increase contrast enhancement.

18. The image processing device according to claim 11, wherein the processor obtains a difference image between the second blurring image and the current frame image, and enhances a contrast of the current frame image through a sum of the current frame image and the difference image.

19. The image processing device according to claim 11, wherein the processor compensates for color difference information of the current frame image on which the contrast enhancement is performed.

20. The image processing device according to claim 19, wherein, when compensating for the color difference information, the processor prevents degradation of a result image to be outputted, by applying a change in brightness information to the color difference information.

* * * * *